No. 751,080. Patented February 2, 1904.

UNITED STATES PATENT OFFICE.

FRIEDRICH KRÜGER, OF BERLIN, GERMANY.

MANUFACTURE OF FIREPROOF BRICKS OR MATERIAL.

SPECIFICATION forming part of Letters Patent No. 751,080, dated February 2, 1904.

Application filed April 20, 1903. Serial No. 153,361. (No specimens.)

*To all whom it may concern:*

Be it known that I, FRIEDRICH KRÜGER, machine-builder, a subject of the German Emperor, residing in the city of Berlin, in the German Empire, have invented certain new and useful Improvements in the Manufacture of Fireproof Bricks or Material, of which the following is a specification.

Fireproof stones, bricks, blocks, or material were hitherto prepared chiefly from burnt clay, &c., whereas according to this invention artificial gypsum of various kinds in ground, but not burnt, state is used as the chief ingredient. The most suitable of the kinds of gypsum in question is the so-called "isinglass-stone" (*Marienglass*) or selenite or mica, (*Fraueneis*.)

The process according to this invention is as follows: Marienglass waste, as representative of calcium sulfates ($CaSO_4$) or anhydrous sulfate of lime, ($CaSO_4$,) is finely ground. Silicate of soda ($Na_2SiO_3$) or silicate of potassium ($K_2SiO_3$) in solid state is heated in a vessel to 100° centigrade, whereby it becomes liquefied. Into this liquid are then introduced ten parts, by weight, of the ground waste of marienglass and one part, by weight, of ground asbestos or magnesite or soapstone, &c., the chief ingredient of which is silicate of magnesia, ($MgSiO_3$.) The whole is then thoroughly stirred until it becomes completely homogeneous, and the plastic mass thus produced is pressed into molds. The molds, with their contents, are slowly heated until they are red-hot and kept at their temperature for a longer or shorter time, according to their dimensions. During the heating a chemical reaction takes place in the mass, with the result that its plasticity disappears and the mass becomes quite hard and capable of resisting the highest temperatures.

I claim as my invention—

A process for manufacturing fireproof stones, bricks, blocks or material consisting in adding a mixture of finely-ground waste of marienglass or other unburnt gypsum ($CaSO_4$) and a small proportion of finely-ground asbestos or soapstone to a heated liquid mass of silicate of soda or of potassium ($Na_2SiO_3$ or $K_2SiO_3$) and mixing the whole until a thoroughly homogeneous plastic mass is obtained, charging molds with them and heating them to a red heat substantially as described.

In witness whereof I have hereunto set my hand, this 24th day of February, 1903, in the presence of two subscribing witnesses.

FRIEDRICH KRÜGER.

Witnesses:
　HENRY HASPER,
　WOLDEMAR HAUPT.